United States Patent
Hsieh

(10) Patent No.: US 8,760,259 B2
(45) Date of Patent: Jun. 24, 2014

(54) ELECTRONIC DEVICE WITH UNLOCKING FUNCTION AND METHOD THEREOF

(75) Inventor: Hsing-Chun Hsieh, Taoyuan County (TW)

(73) Assignee: FIH (Hong Kong) Limited, Kowloon (HK)

( * ) Notice: Subject to any disclaimer, the term of this patent is extended or adjusted under 35 U.S.C. 154(b) by 770 days.

(21) Appl. No.: 12/952,157

(22) Filed: Nov. 22, 2010

(65) Prior Publication Data

US 2012/0050009 A1  Mar. 1, 2012

(30) Foreign Application Priority Data

Aug. 25, 2010  (TW) .............................. 99128367 A

(51) Int. Cl.
*G05B 19/00*  (2006.01)
*G01C 19/00*  (2013.01)
*G06F 3/033*  (2013.01)
*G09G 5/00*  (2006.01)

(52) U.S. Cl.
USPC ...... 340/5.51; 340/5.54; 340/573.1; 715/863; 345/173; 345/179; 345/156; 345/158; 345/537; 702/150

(58) Field of Classification Search
CPC .................. G06F 3/04883; G06F 2200/1637; H04M 2250/22
USPC .................................. 340/5.54, 5.51
See application file for complete search history.

(56) References Cited

U.S. PATENT DOCUMENTS

| | | | |
|---|---|---|---|
| 6,573,883 B1 * | 6/2003 | Bartlett .................. | 345/156 |
| 7,593,000 B1 * | 9/2009 | Chin ..................... | 345/156 |
| 7,667,686 B2 * | 2/2010 | Suh ....................... | 345/156 |
| 7,903,084 B2 * | 3/2011 | Marvit et al. ........... | 345/156 |
| 2006/0204045 A1 * | 9/2006 | Antonucci ............... | 382/107 |
| 2007/0150842 A1 * | 6/2007 | Chaudhri et al. ........ | 715/863 |
| 2008/0165022 A1 * | 7/2008 | Herz et al. ............. | 340/669 |
| 2008/0165145 A1 * | 7/2008 | Herz et al. ............. | 345/173 |
| 2009/0006991 A1 * | 1/2009 | Lindberg et al. ........ | 715/763 |
| 2010/0045619 A1 * | 2/2010 | Birnbaum et al. ........ | 345/173 |

* cited by examiner

*Primary Examiner* — Fekadeselassie Girma
(74) *Attorney, Agent, or Firm* — Novak Druce Connolly Bove + Quigg LLP

(57) ABSTRACT

An electronic device with unlocking function includes an accelerometer, an unlocking module, a touch screen and a storage. The accelerometer detects a direction of movement of the electronic device. The touch screen provides output and input for the electronic device. The touch screen detects a contact path of a user when the user contacts the touch screen. When the contact path matches an unlocking path stored in the storage, the electronic device is unlocked.

13 Claims, 4 Drawing Sheets

ELECTRONIC DEVICE WITH UNLOCKING FUNCTION AND METHOD THEREOF

BACKGROUND

1. Technical Field

The present disclosure relates to unlocking of an electronic device, and more particularly to unlocking an electronic device through an unlocking path.

2. Description of Related Art

Devices with touch screen and/or applications running on such devices may be unlocked by any of several well-known procedures, such as execution a predefined set of keystrokes, or entering a code or password. These procedures, however, have drawbacks. Button combinations may be difficult to perform, and creating, memorizing, and recalling passwords, codes, and the like can be quite burdensome. These drawbacks may reduce the ease of use of the device in general.

Accordingly, there is a need for more efficient, user-friendly procedures for unlocking such devices and/or applications between user interface states such as for a second application, between user interface states in the same application, or between locked and unlocked states.

DETAILED DESCRIPTION

In general, the word "module" as used herein, refers to logic embodied in hardware or firmware, or to a collection of software instructions, written in a programming language, such as, for example, Java, C, or assembly. One or more software instructions in the unit may be integrated in firmware, such as an EPROM. It will be appreciated that module may comprise connected logic units, such as gates and flip-flops, and may comprise programmable units, such as programmable gate arrays or processors. The unit described herein may be implemented as either software and/or hardware unit and may be stored in any type of computer-readable medium or other computer storage device.

Figure 1:
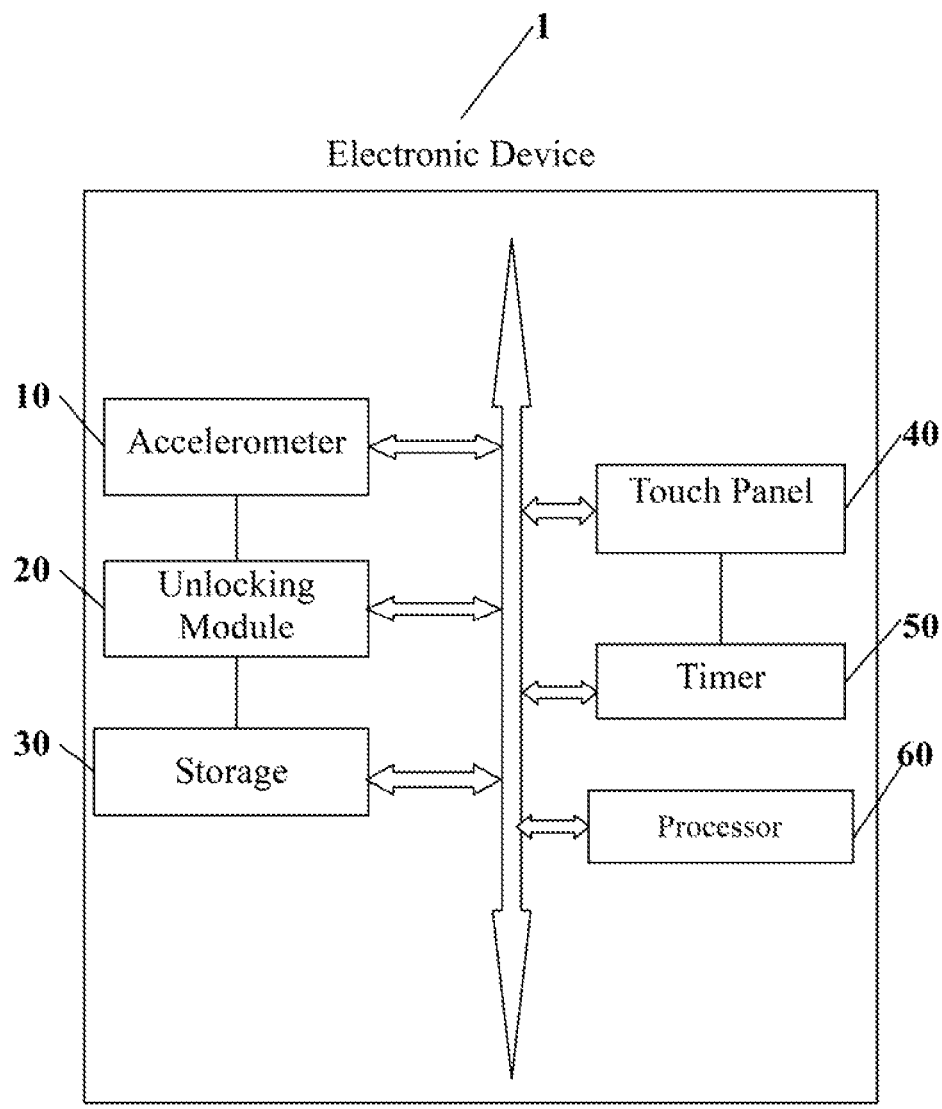
FIG. 1 is a block diagram of one embodiment of an electronic device.

FIG. 1 is a block diagram of one embodiment of an electronic device 1. The electronic device 1 includes an accelerometer 10, an unlocking module 20, a storage 30, a touch screen 40, a timer 50 and a processor 60. The accelerometer 10 detects a direction of movement of the electronic device 1 and sends a corresponding electrical signal indicating the direction of movement of the electronic device 1. The storage 30 stores data needed by the electronic device 1. The touch screen 40 provides output and input for the electronic device 1. The touch screen 40 detects contact of the touch screen 40 using any of a plurality of touch sensitive technologies, including but not limited to capacitive, resistive, infrared, and surface acoustic wave technologies, as well other proximity sensor arrays or other elements for determining one or more points of contact with the touch screen 40. The timer 50 calculates the time of an unlocking procedure of the electronic device 1. In one embodiment, the unlocking module 20 is stored in the storage 30. The processor 60 controls the accelerometer 10, the unlocking module 20, the storage 30, the touch screen 40 and the timer 50 to perform their individual functions. It should be understood that when the electronic device 1 is in an locked state, certain or substantially all or most features of the electronic device 1 are not operational by a user. Similarly, when the electronic device 1 is in an unlock state, all or substantially all features of the electronic device 1 are operational by the user.

The electronic device 1 is generally controlled and coordinated by an operating system, such as UNIX, Linux, Windows, Mac OS, an embedded operating, or any other compatible system. Alternatively, the electronic device 1 may be controlled by a proprietary operating system. Typical operating systems control and schedule computer processes for execution, perform memory management, provide file system, networking, and I/O services, and provide a user interface, such as a graphical user interface (GUI), among other tasks.

Figure 2:
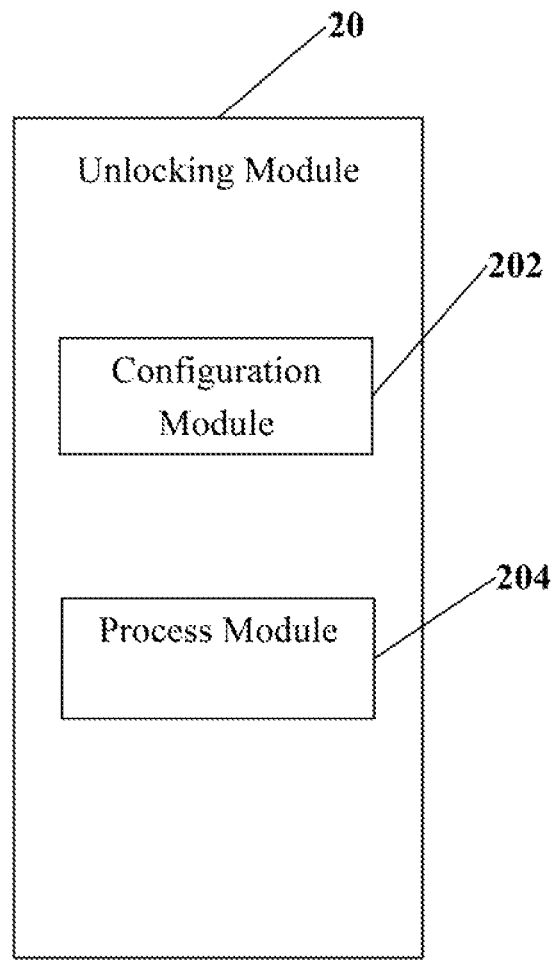
FIG. 2 is a block diagram of one embodiment of an unlocking module of the device of FIG. 1.

FIG. 2 is a block diagram of an unlocking module 20 of the device of FIG. 1. The unlocking module 20 includes a configuration module 202 and a process module 204. The modules 202, 204 comprises computerized code which may be executed by the processor 60. The configuration module 202 configures an unlock image on the touch screen 40. In one embodiment, the unlock image is an image that includes an unlocking object 21 and an unlocking track 22 (see FIG. 3A-B). Movement of the unlocking object 21 is limited to movement along the unlocking track 22. Through recording the movement path of the unlocking object along the unlocking track and comparing the movement path with a predefined path, the electronic device 1 can be changed from a locked state to an unlocked state.

The unlocking object and the unlocking track are image objects shown in the touch screen 40 through a graphical user interface of the electronic device 1. It should be noticed that the shape of the unlocking object and the unlocking track described here is for example but not a limitation. In one embodiment, size of the unlocking object is less than the radius/diameter of the unlocking track so as to reduce the possibility of malfunction of the electronic device 1 when the electronic device 1 is unlocked. Color of the unlocking object can be different from color of the unlocking track and background color of the touch screen 40.

Figure 3:
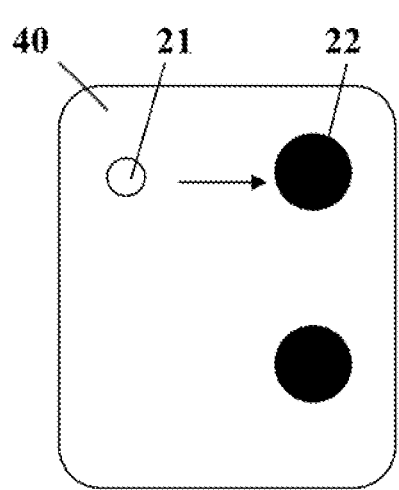
FIG. 3 shows a display of one embodiment of a touch screen in a user-interface locked state of the device of FIG. 1.
Figure 3:
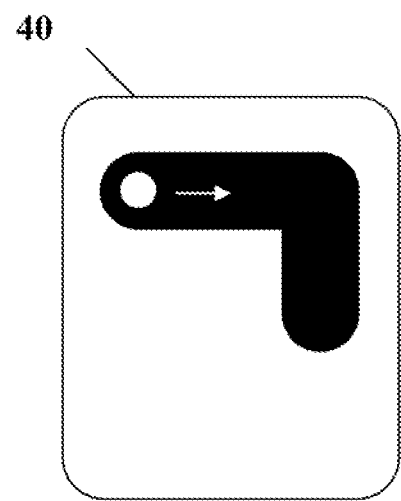

FIG. 3 shows a display of the touch screen 40 in a user-interface locked state of the device of FIG. 1. A white object illustrated on the display is the unlocking object 21. The black path illustrated on the display is the unlocking track 22. Thus, the white object can be moved along the black path to unlock the electronic device 1. In other embodiments, through the graphic interface, the images representing the unlocking object and the unlocking track can present according to the needs of a user or manufacturer.

The configuration module 202 predefines an operating time (e.g., seconds) In one embodiment, if the unlocking module 20 detects that there is no any movement of the unlocking object within the operating time, the electronic device 1 remains in a locked state.

In one embodiment, the configuration module 202 configures multiple coordinates on the touch screen 40 to form a contact path. In one embodiment, the contact path is a track defined by a user's finger contacting the touch screen 40. The configuration module records the track touched by the finger and defines the track as the contact path. The coordinates of the track touched by user at the touch screen 40 represent a central axis of the contact path displaying on the touch screen 40. The coordinates of the track touched by the finger of this embodiment can be multiple coordinates discrete from each other as illustrated in FIG. 3(a). The coordinates of the unlocking track of this embodiment can be at least two coordinate points shown on the touch screen 40. In one embodiment, the coordinates of the unlocking track can be multiple coordinates continuous with each other to form the unlocking path illustrated in FIG. 3(b), so as to virtualize the unlocking path through which the unlocking object can pass.

The coordinates can be defined by the electronic device 1 or by the user. In one embodiment, a series of coordinates can be recorded as the unlocking coordinates when a finger contacts the touch screen 40. On the contrary, when discrete coordinates of the touch screen 40 are touched by the user, those discrete coordinates are defined as discrete tracks illustrated in FIG. 3(a). In other words, the configuration module 202 is cable of supporting two different unlocking modes: discrete process and sequent process. Under the sequent process, the unlocking path is configured according to a coordinate sequence user defined by contacting a coordinate on the touch screen 40. When the electronic device 1 is unlocked, the coordinate sequence of unlocking path is stored in the storage 30 and can be compared with the coordinate sequence stored with an input sequence conducted by user under unlocking operation according to the moving track of the unlocking object. When the unlocking object passes all the coordinates stored in the storage 30 in correct sequence, the process module 204 unlocks the electronic device 1. Under the discrete process, the electronic device 1 is unlocked by correct entry of discrete coordinates defined as discrete tracks by the user. Depending on the embodiment, additional blocks in the flow of FIG. 3 may be added, others removed, and the ordering of the blocks may be changed.

The process module 204 determines whether the time used to unlock the electronic device 1 is less than the predefined time of unlocking procedure in real time. The process module 204 receives output from the accelerometer 10 in real time when the electronic device 1 is unlocked. The process module 204 controls the movement of the unlocking object displayed on the touch screen 40 in accordance with output from the accelerometer 10. The process module 204 records the coordinates at which the unlocking object is located on the touch screen 40.

Figure 4:
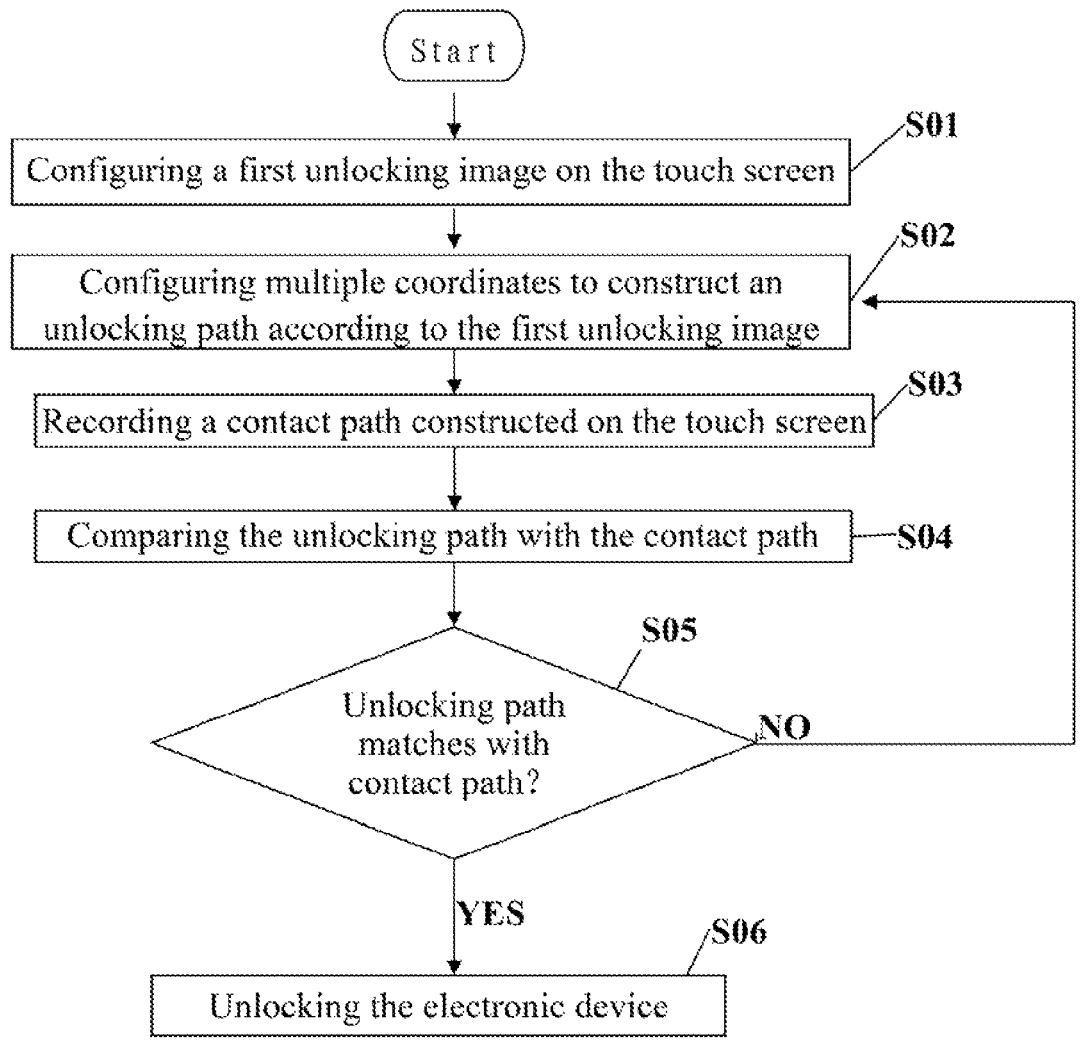
FIG. 4 is a flowchart illustrating an embodiment of an unlocking method for an electronic device.

FIG. 4 is a flowchart illustrating one embodiment of a method for unlocking the electronic device 1. Depending on the embodiment, additional blocks in the flow chart of FIG. 4 may be added, others removed, and the ordering of the blocks may be changed. In block S01, the configuration module 202 configures a first unlocking image on the touch screen 40. In one embodiment, the unlock image is an image that includes the unlocking object 21 and the unlocking track 22.

In block S02, the configuration module 202 configures multiple coordinates touched by a user to construct an contact path displayed on the touch screen 40 according to unlocking modes of the electronic device 1. The configuration module 202 is cable of performing two different unlocking modes: discrete process and sequent process. Under the sequent process, the contact path is configured according to a coordinate sequence defined by coordinates touched by user on the touch screen 40 through finger, touch pen or gesture. The coordinate sequence of contact path is stored in the storage 30, and be compared with the unlocking path.

In block S03, upon touching the touch screen 40, the configuration module 204 configures a second unlocking image on the touch screen 40 through the graphic user interface, on which each coordinate is represented as the unlocking track. The central position of the unlocking track is the coordinate of the touch screen touched by the user. The configuration module 202 also configures an unlocking object on the touch screen 40 through the graphical user interface. The initial coordinate of the unlocking object is the initial coordinate of the coordinate sequence of the unlocking path. The timer 50 calculates a time period.

In block S04, the process module 206 determines whether the time period exceeds the predefined unlocking period in real time. If the time period exceeds the predefined unlocking period, the block S01 is repeated.

If the time period does not exceed the predefined unlocking period, in block S05, the process module 208 receives output from the accelerometer 10 in real time and controls the movement of the unlocking object accordingly to the movement direction of the electronic device 1 sent from the accelerometer 10.

In block S06, the process module 204 records the path followed by the unlocking object and determines whether the contact path matches the coordinate sequence of the unlocking path. If not, the block S02 is repeated.

If the path matches the coordinate sequence of the unlocking path, in the block S07, the process module 204 unlocks the electronic device 1.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A method for unlocking an electronic device comprising a touch screen and an accelerometer, the method comprising:
   configuring a first unlocking image on the touch screen;
   constructing an unlocking path displayed on the touch screen according to the first unlocking image;
   configuring a second unlocking image comprising an unlocking object on the touch screen, on which each coordinate is represented as an unlocking track;
   receiving output from the accelerometer and controlling the movement of the unlocking object in accordance with the output from the accelerometer and movement direction of the electronic device acquired from the accelerometer;
   recording a path followed by the unlocking object by recording coordinates at which the unlocking object is located on the touch screen;
   comparing the recorded path with the unlocking path; and
   unlocking the electronic device when the recorded path matches with the unlocking path.

2. The method of claim 1, wherein the first unlocking image further comprises an unlocking track and an unlocking object.

3. The method of claim 1, further comprising:
   determining whether the time period exceeds a predefined unlocking period in real time; and
   renewing the unlocking path if the time period exceeds the predefined unlocking period.

4. The method of claim 1, wherein the step of comparing the unlocking path with the path comprises:
   comparing the recorded path with the unlocking path according to the multiple coordinates in a configuration sequence.

5. The method of claim 1, wherein the unlocking path displayed on the touch screen is constructed according to unlocking modes of the electronic device which comprises a discrete process and a sequent process.

6. The method of claim 5, wherein the unlocking path under the sequent process is configured according to a coordinate sequence defined by user interaction with the touch screen.

7. The method of claim 5, wherein the electronic device is unlocked under the discrete process by correct entry of discrete coordinates defined as discrete tracks.

8. An electronic device comprising an accelerometer, a touch screen, a storage and a processor, comprising:
- a configuration module that configures a first unlocking image on the touch screen, and constructing an unlocking path displayed on the touch screen according to the first unlocking image;
- the configuration module further configures a second unlocking image comprising an unlocking object on the touch screen, on which each coordinate is represented as an unlocking track;
- a process module that receives output from the accelerometer and controls the movement of the unlocking object in accordance with the output from the accelerometer and movement direction of the electronic device acquired from the accelerometer;
- the process module further records a path followed by the unlocking object by recording coordinates at which the unlocking object is located on the touch screen; and
- an unlocking module that unlocks the electronic device from a locked state when the recorded path matches with the unlocking path, wherein a receiving module, the process module and the unlocking module are stored in the storage and controlled by the processor.

9. The electronic device of claim 8, wherein the configuration module stores the unlocking path in the storage.

10. The electronic device of claim 8, wherein the touch screen outputs a message to inform a user when the electronic device is unlocked.

11. The electronic device of 8, wherein the unlocking path displayed on the touch screen is constructed according to unlocking modes of the electronic device which comprises a discrete process and a sequent process.

12. The electronic device of 11, wherein the unlocking path under the sequent process is configured according to a coordinate sequence defined by user interaction with the touch screen.

13. The electronic device of 11, wherein the electronic device is unlocked under the discrete process by correct entry of discrete coordinates defined as discrete tracks.

* * * * *